April 12, 1966  A. L. HUBBARD  3,245,210
COTTON HARVESTER
Filed Sept. 5, 1963
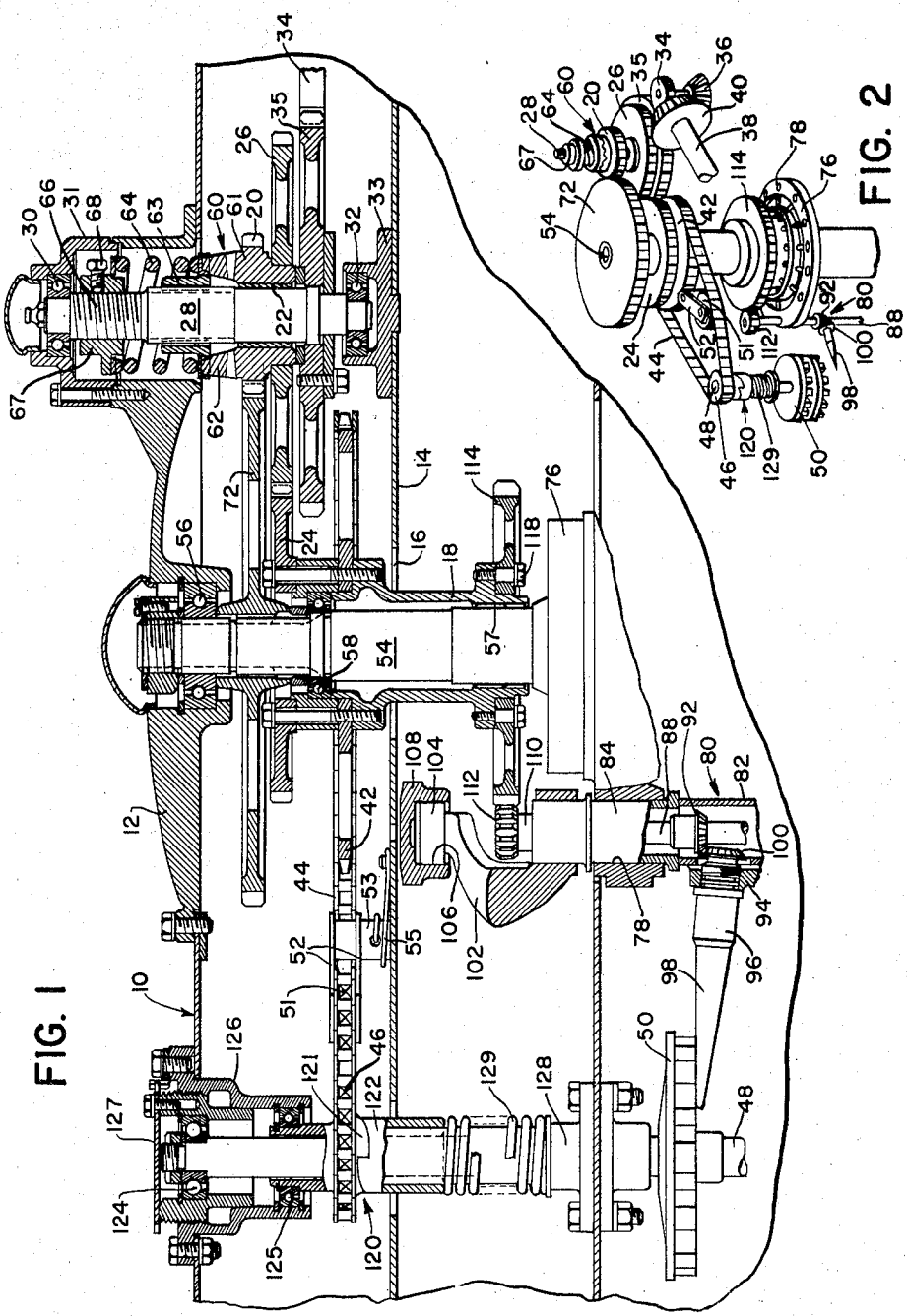
INVENTOR.
A. L. HUBBARD
BY William A. Murray
ATTORNEY United States Patent Office 3,245,210
Patented Apr. 12, 1966

3,245,210
COTTON HARVESTER
Arthur L. Hubbard, Des Moines, Iowa, assignor to Deere & Company, Moline, Ill., a corporation of Delaware
Filed Sept. 5, 1963, Ser. No. 306,784
6 Claims. (Cl. 56—44)

This invention relates to a cotton harvester and more particularly relates to a specific drive operating the harvesting mechanism within the cotton harvester having suitable safeguards for preventing damage to the harvesting mechanism should an overload of cotton or foreign obstruction occur in the harvesting operation that would prevent proper operation thereof.

In conventional type cotton harvesters, for example of the type shown in the Johnson Patent 2,140,631, there is provided an upright picking drum with laterally extending spindles that extend radially from the drum and, as the drum rotates, passes through a plant passage and harvests the ripened cotton from the plants. In normal operation of these cotton harvesters, there is a direct drive to each of the spindles through a gear arrangement fully disclosed in the aforementioned Johnson patent. In operation the drum, unless otherwise restricted, is relatively free to rotate and the gear drive to the spindles is fixed to rotate with the drum. In this type of drive there is the direct drive of the respective spindles and there is a reactive drive which tends to drive the entire drum about its axes. Normally the gear arrangement is such that the spindles rotate about their axes at a speed considered normal for removing the cotton bolls from the plant. Also the reactive force causes the drum to rotate so that the spindles move from front to rear through the passage. However, to insure proper speed of the drum, a second or positive drive is normally provided to maintain the drum at the ground speed of the harvester.

One problem which exists relative to a more positive drive is that often times foreign matter will enter into the cotton harvester, or the cotton harvester will become clogged so that the drum may be held against rotation. By maintaining a positive drive to the drum, upon the latter conditions occurring, the spindles will be injured or portions of the drum will break.

It is therefore the primary object of the present invention to create in the above type of drive an overload-releasing mechanism in the direct drive from the main power source to the drum. Consequently, should a foreign object become lodged in the harvester, the drum will be free to stop. In this way no direct damage will be done to the spindles.

In the conventional type cotton harvester there is provided a doffer drum or mechanism operating in conjunction with the picking spindles on the drum to doff or to remove the cotton from the spindles after it has been removed from the cotton plants. A chain drive is provided that extends from the picking drum to the doffing drum. There is considerable weight involved in the entire doffing drum and the chain drive is such that the drum rotates at a relatively high rate of rotation. Should the picking drum be forced to stop due to a foreign object or clogging of the machine, the inertia created by the weight and rotation of the doffing drum will operate as a driving force to continue rotation of the picking drum. This, of course, can also damage the spindles or other portions of the picking drum. Therefore, it is a further object of the present invention to incorporate in the drive between the picking drum and doffing drum a yielding type drive permitting the inertia built up in the doffing drum not to be transmitted to the spindle drum upon the spindle drum being held against rotation.

Other objects and advantages of the present invention will become apparent to those skilled in the art as the nature of the invention is better understood from the following description and as shown in the accompanying drawings.

FIG. 1 is an elevational view, partially in section, showing a portion of the harvesting mechanism and its drive mechanism.

FIG. 2 is a schematic perspective view showing portions of the driving mechanism and the harvesting mechanism.

The disclosure in the Johnson patent, mentioned above, may serve as a basis for an understanding of the entire cotton picker and therefore many of the details of the background structure will be omitted. It will be understood, of course, that basic structures different from that herein disclosed or that disclosed in the Johnson patent are incidental to the adaptation of the improvements forming the subject matter of the present invention.

The picker construction fundamentally involves some kind of a support 10 in the form of a housing having a top wall or cover 12 and a bottom wall or floor 14. The bottom wall or floor has a circular opening 16 therein for accommodating a vertical sleeve 18 having an upper part within the compartment of the housing 10 and a lower part below the housing floor 14. The upper part of the sleeve 18 has secured thereto an input member in the form of a gear 24 in constant mesh with intermediate gear 26. The gear 26 is fixed to the hub of a second gear 20 in turn journaled at 22 on a short idler shaft 28 journaled at its opposite ends in bearings 30 and 32 respectively. The bearings 30, 32 are retained in a detachable cover support 31 and a floor support 33. Fixed to the idler shaft 28 is a third gear 35. As illustrated schematically in FIG. 2, the gear 35 is in constant mesh with a driving pinion 34 which is rigid or unitary with an input bevel pinion 36. A main power source as illustrated by the power shaft 38 has keyed thereto a bevel pinion 40 in constant mesh with the input pinion 36. The power shaft 38 may be driven in any suitable manner, not important here.

There is also secured to the upper part of the sleeve 18 a doffer-driving sprocket 42 about which is trained a chain 44 to drive a sprocket 46 rotatably carried on the upper end of a vertical doffer shaft 48. A shaft 48 carries thereon a vertical series of doffers such as shown at 50. An idler sprocket 51 completes the drive from the sprocket 42 to the doffer shaft 48. The idler sprocket 51 is carried on arms 52 having a hub portion 53 pivotally mounted on a pin fixed to the wall 14. A torsion spring 55 maintains tension in the chain 44.

The sleeve 18 loosely surrounds or is concentric with the vertical drum shaft 54 appropriately journaled in a bearing 56 supported in the cover 12 of the housing or support 10. An intermediate part of the drum shaft is journaled by a bearing 57 at the lower part of the sleeve 18. In addition to the bearings 56 and 57, a third bearing 58 is installed between the gear 24 and the upper intermediate portion of the drum shaft 54.

The upper end of the drum shaft 54 has keyed thereto an input or shaft-driving gear 72 in constant mesh with a gear 20 on the idler shaft 28. The gears 20, 26 are driven through a torque-limiting drive in the form of a slip clutch, indicated in its entirety by the reference numeral 60. The clutch 60 is composed of one rosette 61 formed on the upper face of the hub of the gear 20 and a second engaging rosette 62 adapted to move axially with a collar 63 keyed to the shaft 28. The rosettes 61, 62 are biased into engagement by a spring 64. The upper end of the shaft 28 is threaded at 66 and receives a nut 67 that bears against the upper end of the spring 64. Consequently the torque required to cause the clutch 60 to slip may be adjusted by threading the nut 67 along the surface 66. A set screw 68 is provided to lock the nut 67 to the shaft 28. Since the driving gears 20, 26 are both driven from the input gear 34 and since the gears 24 and 72 are of different diameters, the shaft 54 and sleeve 18 may have different speeds of rotation.

The lower part of the drum shaft 54 has connected thereto in any appropriate manner the upper portion of a drum head 76 and the head and shaft together form a drum element. This head is generally circular as viewed from above and is, of course, coaxial with the drum shaft 54. The peripheral portion of the drum head has formed therein a plurality of circular series of journals 78 respectively on vertical axes and generally horizontally coplanar. As will be seen, the drum head 76 is spaced below the lower end of the sleeve 18.

The drum head is part of a picking drum unit, designated generally by the numeral 80, including a plurality of hollow columns 82, each having a hardened upper end 84 journaled in the journals 78 of the drum head. Each column 82 encloses an upright spindle driving shaft 88 and each shaft is journaled adjacent an upper portion thereof by a suitable bearing in the end 84. Each of the shafts 88 has keyed thereto a plurality of vertically spaced bevel pinions 92. Each column 82 has a plurality of vertically spaced side openings over each of which is rigidly supported a spindle carrier 94. There are, of course, as many carriers 94 as there are bevel pinions 92.

Each of the spindle carriers 94 receives a spindle bearing 96 within which is journaled a generally radially outwardly projecting cotton picking spindle 98. The inner end of each spindle has thereon a bevel pinion 100 in constant mesh with the driving pinion 92 on the associated spindle-driving shaft 88. This construction is largely conventional and to the extent that the present disclosure differs in details from other designs, the distinctions are immaterial.

The upper end of each column 82 projects somewhat above the drum head 76 and has keyed thereto a crank 102 on the free end of which is journaled a roller or follower 104 which follows a cam track 106 in a plate 108 fixed to the under portion of the housing or support 10. The details of a representative structure are not important here and may be gained from an examination of the aforementioned Johnson patent. Since the cam track 106 is of a different shape than and is offset from the circle on which lie the axes of the spindle-driving shafts 88, the spindle column 82 will be caused to oscillate about the vertical axes at 78 as the entire drum unit 80 rotates about the axis of the drum shaft 54. This motion will cause the spindles 98 to assume different positions as they move into and out of the plant row and through the associated doffers 50, all as is generally conventional.

Each of the spindle-driving shafts 88 has an upper part 110 that projects above the upper end of its column 82. This part may be said to include a drivable member or portion in the form of a small pinion 112 and all the pinions 112 are coplanar in a horizontal plane above the drum head 76 and below the floor 14 of the support or housing 10. These pinions are in constant mesh with a relatively large driving gear 114 which constitutes a driving member for rotating the spindle shafts 88 via the pinions 112. The gear 114 is fixed to the sleeve 18 by means of cap screws 118.

The spindles are driven from the main power source 38 through a spindle drive that includes the pinion 26 and the driven gear 24. The sleeve which is fixed to the gear 24 operates to drive the spindle drive shaft 88 and consequently the entire number of picking spindles 98. Disregarding for the time being the direct drum drive between the gears 20, 72 and drum shaft 54, the resistance of the various forces in the spindle drive shafts 88 and the resistance between the various bevel gears 92, 100 will in effect create a reactive force which tends to rotate the drum 80 about the axis of the shaft 54.

If there were no direct drive to the drum shaft 54, such as the spur gear drives 20, 72, the normal tendency would be for the spindles 98 to operate to rotate about their axis sufficiently to harvest in an efficient manner the cotton bolls from the plants. Also the reactive force tending to drive the drum about its own axis would be such that it drives the passage side of the drum rearwardly or in the direction the harvester moves over the ground. However, without the direct drive to the drum shaft 54, should an obstruction or overloading of the cotton harvester occur, the drum 54 would cease rotation and the spindles 98 would increase the rotation about their own axes. This would, of course, merely shred the plants and would create little or no actual harvesting of the plants. The positive drive through gears 20, 72 to the shaft 54 will, therefore, normally maintain the drum at the ground speed. If for any reason the reactive force created by the indirect drive to the drum is sufficient to move the drum at a speed greater than ground speed, the positive drive between the gear 20, 72 will operate as a brake to prevent such. Should an obstruction be moved through the harvester, or should the harvester become sufficiently clogged that the drum will not rotate, the slip clutch 60 will permit the rosettes 61, 62 to separate and consequently the reactive drive and the positive drive to the shaft 54 will be shut off to thereby permit the drum to stop. For proper protection for the drum, it is necessary, however, that only the direct drive to the drum be disengaged. This would permit the drum and spindles to cease rotation.

As mentioned previously, the doffer drum shaft 48 is driven from the sleeve 18 through the sprockets 42, 46 and chain 44. The latter drive will normally create a high rate of rotation of the doffer mechanism. Should the picking drum suddenly cease rotation due to an obstruction or other causes, there would be a tendency, due to the inertia built up in the doffing mechanism, to drive the picking drum 80 through the chain 44. To overcome the initial load created by the inertia of the doffing mechanism, the torsion spring 55 and the arms 52 permit the idler sprocket 52 to release the tension and to momentarily remove the driving force created in the chain 44. As a second means for preventing the reactive force on the picking drum from the doffing mechanism, there is provided an overrunning clutch, indicated in its entirety by the reference numeral 120 between the doffer shaft 48 and the sprocket 46.

The overrunning clutch 120 is composed of upper and lower jaw members 121, 122 respectively, the former being rigid with the sprocket 46. The sprocket 46 and the jaw clutch part 121 are free to rotate on the shaft 48. The lower jaw member 122 is keyed to the shaft 48. The teeth on the jaws 121, 122 are such as to cause a one-way drive between the two jaw members as the sprockets 42, 46 and the chain 44 move in a clockwise direction, as viewed in FIG. 2. However, should the drum 80, or sleeve 18 be held against rotation, the lower jaw 122 would merely rachet over the teeth of the upper jaw 121 until the doffer slows to a complete stop. In conventional manner the lower jaw 121 may move axially along the shaft 48 but is not free to rotate thereon.

The shaft 48 is journaled for rotation by upper bearings 124, 125 carried in a journal housing 126. The upper bearing 124 is carried in a cap or cover 127 that is vertically adjustable in the housing 126 for purposes of vertically adjusting the shaft 48. The shaft 48 also is journaled at its midportion by suitable means provided in a journal housing 128. A clutch spring 129 is provided between the lower clutch jaw 122 and the housing 128. The tension of the spring 129 is such as to permit relatively easy ratcheting should the drive to the drum be instantaneously locked.

As previously mentioned, the overrunning clutch 120 and the spring loaded idler 51 will prevent damage to the drum through the driving force created through the inertia of the doffing drum and upon the drum suddenly being held against rotation. Viewing the entire drive mechanism as a whole, the slip clutch 60 will permit the picking drum 80 to stop rotation upon a sufficient resistance being created and the overrunning clutch 120 and the torsion loaded idler 51 will eliminate damage to the picking drum 80 due to the inertia of the doffing drum. Consequently, the only damage that can be done to the picking drum would be due to its own inertia. However, in normal operation the inertia is such and the speed of the drum is such that this would not create a major problem.

It should be recognized that only one form of the invention has been shown. It should also be recognized that other forms and variations will occur to those skilled in the art without departing from the nature of the invention as set forth. Therefore, while the present disclosure of the invention is shown in concise and detailed manner for the purpose of completely illustrating the principles of the invention, it should be understood that there is no intention to limit or narrow the invention beyond the broad concept set forth in the appended claims.

What is claimed is:

1. Cotton harvester and driving mechanism comprising:
   a support;
   a picking drum unit carried on the support rotatable about an upright axis including
      (a) a drum head,
      (b) a drum shaft rigid with the head on the aforesaid axis,
      (c) a plurality of angularly spaced upright spindle shafts journaled in the head and spaced radially from the axis,
      (d) a plurality of vertically spaced picking spindles extending laterally from and drivingly connected to the spindle shafts for rotation about their own axes;
   an upright doffing mechanism carried on the support rotatable about an upright axis including
      (a) a doffer shaft journaled on the support,
      (b) a plurality of doffing plates supported on and extending radially from the shaft and vertically spaced on the order of the spindle spacing, the plates being effective to contact cotton on the picking spindles;
   a main power source;
   an upright idler shaft carried on the support and connected to the power source to effect rotation thereof;
   a double drive gear arrangement extending between the drum shaft and idler shaft with a first drive connected to the spindle shafts to effect rotation thereof and a reactive rotation of the drum about its axis, and a second drive directly connected to the drum shaft;
   an overload releasable drive between the gear arrangement and idler shaft adapted to release at least the direct drive to the drum;
   and a one way drive to the doffing mechanism responsive to rotation of the picking drum to effect rotation of the doffing mechanism but effective to permit rotation of the doffing mechanism upon reduced rotation of the drum.

2. Cotton harvester and driving mechanism comprising:
   a support;
   a picking drum unit carried on the support rotatable about an upright axis including
      (a) a drum head,
      (b) a drum shaft rigid with the head on the aforesaid axis,
      (c) a plurality of angularly spaced upright spindle shafts journaled in the head and spaced radially from the axis,
      (d) a plurality of vertically spaced picking spindles extending laterally from and drivingly connected to the spindle shafts for rotation about their own axes;
   an upright doffing mechanism carried on the support rotatable about an upright axis including
      (a) a doffer shaft journaled on the support,
      (b) a plurality of doffing plates supported on and extending radially from the shaft and vertically spaced on the order of the spindle spacing, the plates being effective to contact cotton on the picking spindles;
   a main power source;
   an upright idler shaft carried on the support and connected to the power source to effect rotation thereof;
   a drum driving mechanism including
      (a) a spindle drive extending between the idler shaft and the spindle shafts to effect rotation thereof and a reactive rotation of the drum about its axis, and
      (b) a drum drive between the drum shaft and idler shaft effecting rotation of the drum at a predetermined speed,
   said drive mechanism further having a power releasing portion effective to disengage at least the drum drive of the driving mechanism upon the drum being obstructed to prevent rotation at the predetermined speed;
   and a one way drive to the doffing mechanism responsive to rotation of the picking drum to effect rotation of the doffing mechanism but effective to permit rotation of the doffing mechanism upon reduced rotation of the drum.

3. The invention defined in claim 2 in which:
   the power releasing portion is a slip clutch effective to release upon a predetermined resistance to rotation of the drum unit, and further characterized by adjustable means thereon adapted to adjust the clutch to predetermine the amount of resistance required before release occurs.

4. The invention defined in claim 2 in which:
   the one way drive includes an overrunning clutch effective to permit the doffing mechanism to continue rotation due to its inertia when the drum is restricted against rotation without creating a reactive force on the drum.

5. Cotton harvester and driving mechanism comprising:
   a support;
   a picking drum unit carried on the support rotatable about an upright axis including
      (a) a drum head,
      (b) a drum shaft rigid with the head on the aforesaid axis,
      (c) a plurality of angularly spaced upright spindle shafts journaled in the head and space radially from the axis,
      (d) a plurality of vertically spaced picking spindles extending laterally from and drivingly connected to the spindle shafts for rotation about their own axes;
   an upright doffing mechanism carried on the support rotatable about an upright axis;
   a main power source;
   a drive mechanism between the drum shaft and the main power source including
      (a) a spindle drive connected to the spindle shafts to effect rotation thereof and a reactive rotation of the drum about its axis, and
      (b) a drum drive connected to the drum shaft effecting rotation of the drum at a predetermined speed, said drive mechanism being responsive to disengage at least the drum drive from the power source upon the drum being sufficiently obstructed against rotation;

and a drive to the doffing mechanism responsive to rotation of the picking drum to effect rotation of the doffing mechanism, the latter drive being tensioned to yield whereby the inertia of the doffing mechanism will be cushioned within the drive upon the picking drum stopping its rotation.

6. Cotton harvester and driving mechanism comprising:

a support;

a picking drum unit carried on the support rotatable about an upright axis including
    (a) a drum head,
    (b) a drum shaft rigid with the head on the aforesaid axis,
    (c) a plurality of angularly spaced upright spindle shafts journaled in the head and spaced radially from the axis,
    (d) a plurality of vertically spaced picking spindles extending laterally from and driving connected to the spindle shafts for rotation about their own axes;

an upright doffing mechanism carried on the support rotatable about an upright axis including
    (a) a doffer shaft journaled on the support,
    (b) a plurality of doffing plates supported on and extending radially from the shaft and vertically spaced on the order to the spindle spacing, the plates being effective to contact cotton on the picking spindles;

a main power source;

a drive mechanism between the drum shaft and the main power source including
    (a) a spindle drive connected to the spindle shafts to effect rotation thereof and a reactive rotation of the drum about its axis, and
    (b) a drum drive connected to the drum shaft effecting rotation of the drum at a predetermined speed, said driving mechanism being responsive to disengage at least the drum drive from the power source upon the drum being sufficiently obstructed against rotation, a drive to the doffing mechanism responsive to rotation of the picking drum to effect rotation of the doffing mechanism and including a spring tensioned chain drive effective to yield with reduced rotation of the drum.

References Cited by the Examiner

UNITED STATES PATENTS

| | | | |
|---|---|---|---|
| 1,926,337 | 9/1933 | Johnston | 56—44 |
| 2,821,832 | 2/1958 | Morkoski | 56—44 |
| 3,005,303 | 10/1961 | Hubbard | 56—41 |

ABRAHAM G. STONE, *Primary Examiner.*

RUSSELL R. KINSEY, *Examiner.*